United States Patent [19]

Dainis et al.

[11] Patent Number: 4,923,155
[45] Date of Patent: May 8, 1990

[54] TARGET SUPPORT DEVICE FOR CALIBRATION OF CAMERAS

[76] Inventors: Andrew Dainis, 2002 Rualan St., Adelphia, Md. 20783; Geoffrey Bird, 28 S. Floyd St., Alexandria, Va. 22304

[21] Appl. No.: 285,415

[22] Filed: Dec. 16, 1988

[51] Int. Cl.$^5$ ............................................. F16M 3/00
[52] U.S. Cl. .................................. 248/163.1; 248/165; 248/166; 73/1 R
[58] Field of Search ............... 73/1 R, 1 D, 1 V, 1 H; 356/1, 4.5; 248/163.1, 165, 166, 167, 434, 435, 168, 169, 170, 171, 436, 439; 367/13

[56] References Cited

U.S. PATENT DOCUMENTS

| | | | |
|---|---|---|---|
| 3,877,096 | 4/1975 | Scesney | 116/210 X |
| 4,203,315 | 5/1980 | Vicu et al. | 73/1 R |
| 4,339,880 | 7/1982 | Hall | 248/163.1 X |
| 4,457,625 | 7/1984 | Greenleit et al. | 356/360 |
| 4,577,299 | 3/1986 | Blaschke et al. | 367/125 X |
| 4,583,298 | 4/1986 | Rough | 73/1 R X |

Primary Examiner—Tom Noland

[57] ABSTRACT

A cable assembly forming a number of tetrahedrons having common sides and vertices is maintained in tension by forces exerted on the vertices by a supporting structure. Spherical optical target objects are incorporated in the vertices and at points along the cables. The supporting structure consists of a central column having flexible radial arms at each end to provide necessary forces to the cable assembly. The arms may be folded to lie along the central column for compact storage of the total device.

11 Claims, 3 Drawing Sheets

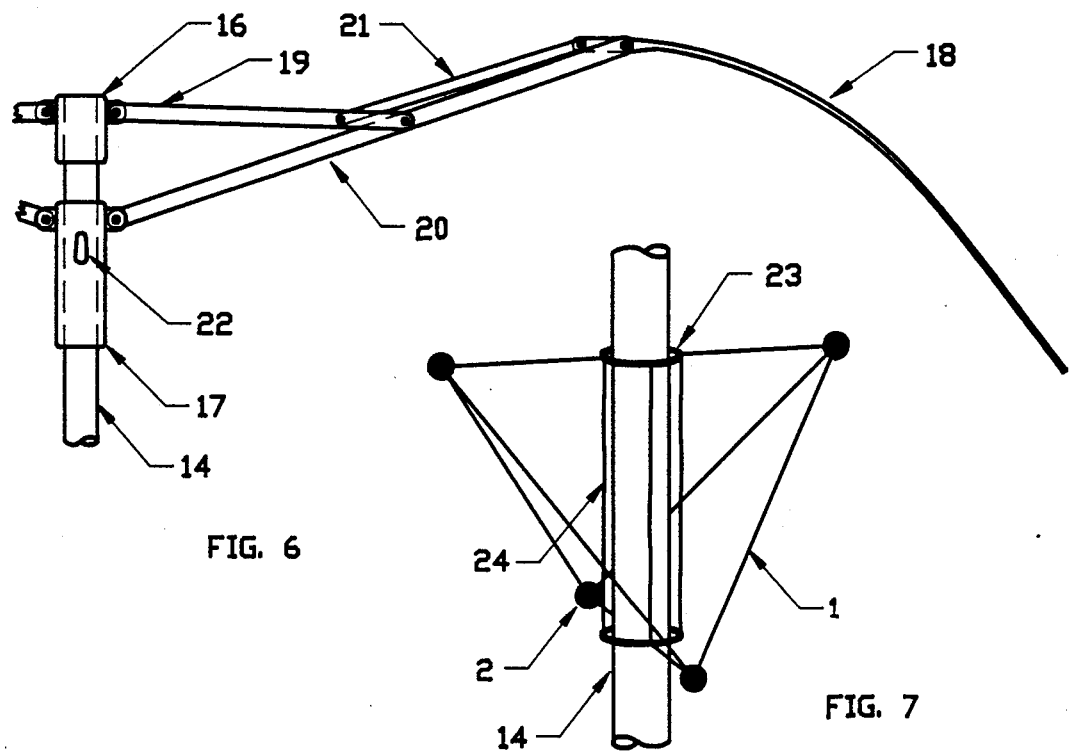
FIG. 6
FIG. 7
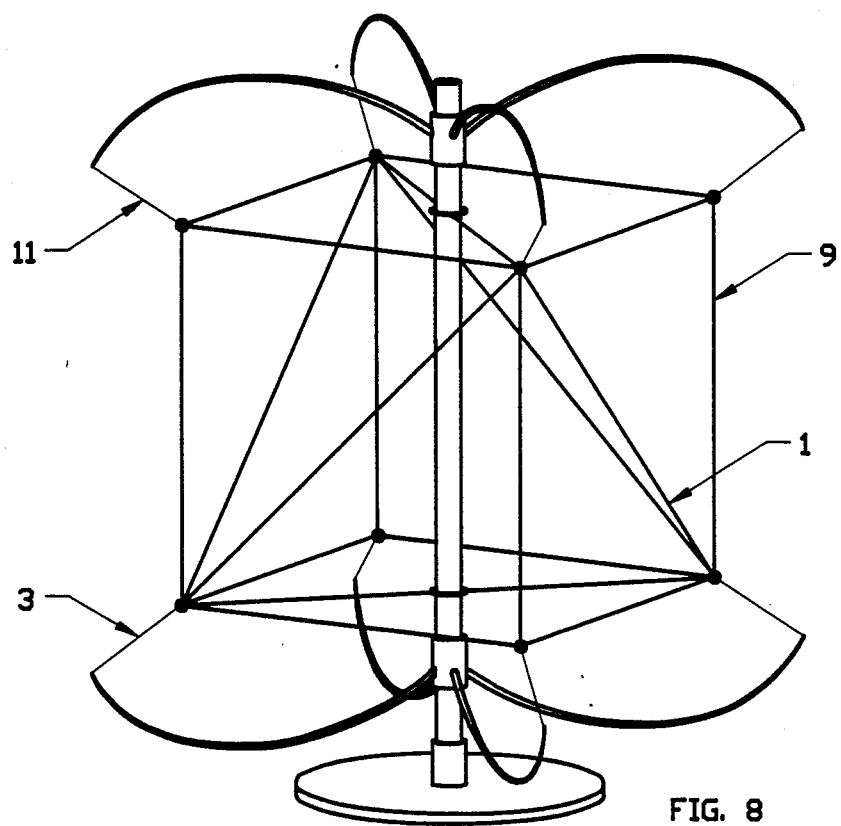
FIG. 8

TARGET SUPPORT DEVICE FOR CALIBRATION OF CAMERAS

BACKGROUND OF THE INVENTION

1. Field of the Invention

The invention relates to the field of close-range photogrammetry and pertains to applications requiring the presence of a set of optical target objects accurately distributed throughout a three-dimensional volume. From measurements of the coordinates of the targets in the image of a camera and a knowledge of the locations of the targets in three-dimensional space, the camera's location and orientation relative to the target distribution may be determined. A system of two or more cameras in which each camera has been calibrated in such a manner may then be used to perform three-dimensional measurements.

2. Description of the Prior Art

Camera system calibration structures have generally been constructed from rigid components which function to establish positions and maintain separation of the target objects. Cubes, tetrahedrons, and joined rods are some forms that have been utilized. These rigid component devices have the following drawbacks:

1. They are difficult and expensive to manufacture to necessary tolerances.
2. Once assembled, it is difficult to check their accuracy.
3. They are usually fragile and are easily bent or distorted, necessitating frequent recalibration.
4. Larger structures are heavy and tend to distort under their own weight.
5. Structural members tend to obscure targets and prevent the targets from being imaged from all directions.
6. To be practical the devices must fold or disassemble for transportation and storage. Such a requirement imposes further complications in the design and manufacture of the devices since they must always reassemble precisely to their original dimensions.
7. For devices consisting of more than a few components, disassembly and assembly times present a major inconvenience.

Plumb lines supporting target objects have also been utilized. The disadvantages of such devices are:

1. The plumb lines have a tendency to oscillate with very little damping when perturbed by air currents, etc.
2. An accurate horizontal reference is required since three or more lines must normally be employed.
3. If the targets are directional in nature, e.g. light emitting diodes, it is difficult to precisely control their direction.

SUMMARY OF THE INVENTION

The invention is a folding device for supporting optical target objects in three-dimensional space in an accurate and highly reproducible manner. The target objects are incorporated into a cable assembly which is tensioned by a supporting frame. The tensioned cable assembly acts as a rigid body which has very small mass, is robust, may be easily manufactured to high precision, and provides minimum obscuration of targets. The tensioning structure is collapsible and does not require to be manufactured to high tolerances. The device may be readily folded for storage and transportation without disassembly, and just as quickly errected to its original dimensions. It overcomes many of the disadvantages of rigid frames which are difficult to manufacture and maintain in calibration, and require considerable care and time in disassembly and assembly.

BRIEF DESCRIPTION OF DRAWINGS

FIG. 6 is a detailed drawing of the support structure folding mechanism.

FIG. 7 is a detailed drawing showing the means by which the central column of the support structure is accomodated without interfering with the cable assembly.

FIG. 8 is a perspective view of the complete device incorporating a cable assembly having the form of a cube.

DESCRIPTION OF THE PREFERRED EMBODIMENTS

Figure 1:
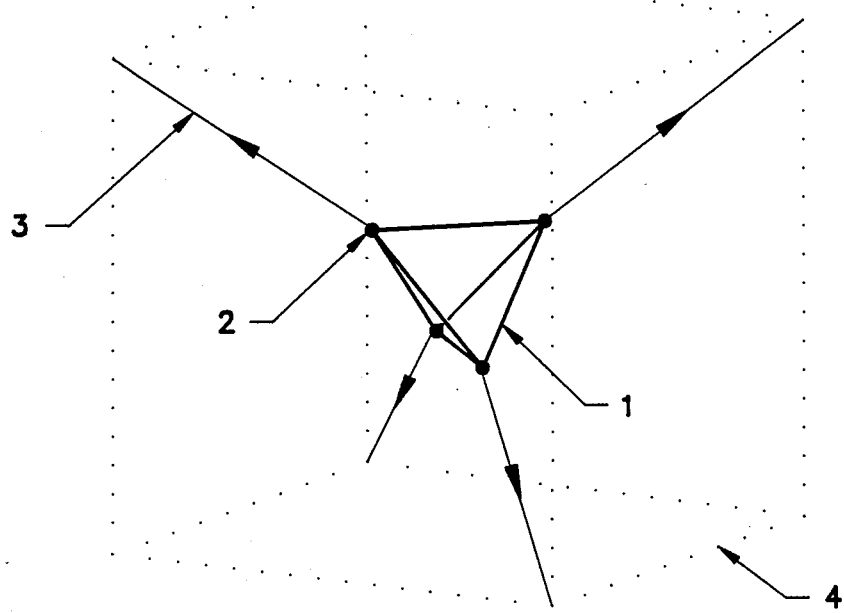
FIG. 1 is a perspective view of a tetrahedron cable assembly also indicating the necessary tension directions.

A tetrahedron is a triangular pyramid consisting of four plane triangular faces joining to form six edges. A structure consisting of six lengths of material joined at four vertices forms a tetrahedron and constitutes the simplest three-dimensional structure capable of maintaining its shape solely by virtue of fixed lengths between corner connections. Referring to FIG. 1, a tetrahedron 1 comprised of six tension members is supported and maintained in tension by outward forces exerted on the vertices 2 through four tension members 3 which attach to a support structure schematically represented by the cube 4. For convenience, the term "cable" will be used in place of "tension member", but it should be understood that the apparatus can be constructed in accordance with the invention with rods, chains, or other types of tension members, the important characteristic thereof being that the members are inextensible in the range of forces involved. When appropriately tensioned, the assembly comprised of six cables and four junctions represents a stable and precisely defined structure into which optical target objects may be incorporated at the junctions and attached to any point along each of the six cables.

Figure 2:
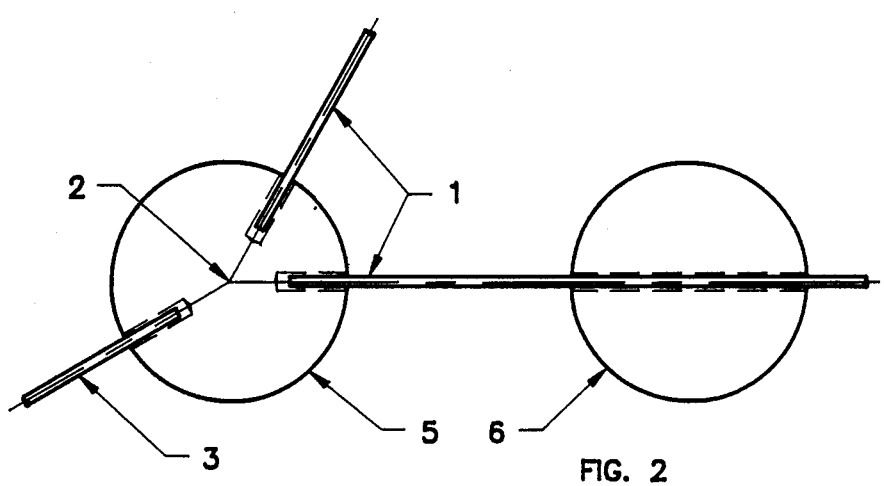
FIG. 2 illustrates the incorporation of spherical target objects into the cable assembly.
Figure 3:
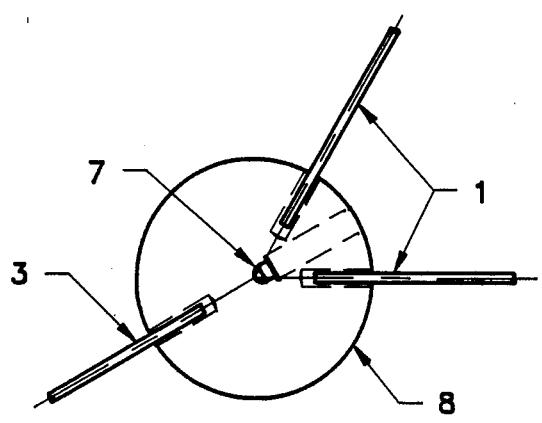
FIG. 3 illustrates the incorporation of a target comprised of an active light source into a sphere enclosing a cable junction.

In standard photographic and video system measurement applications, spherical target objects of suitable contrast with respect to the background are commonly utilized. Spherical targets result in circular images when viewed from any direction and permit the accurate location of sphere centers in the images recorded by cameras. With reference to FIG. 2, the cable junctions 2 may incorporate, as targets, spheres 5 made out of a suitable rigid material, with the centers of the spheres lying at the true intersections of the cables 1 and 3 forming each junction, and into which the cables are anchored at locations such that when the assembly is properly tensioned, the line of each cable passes exactly through centers of the spheres. Any number of additional target spheres 6 may also be distributed along the cables as illustrated in FIG. 2. Some types of measurement systems employ active light sources as targets. FIG. 3 illustrates how a light source may be incorporated inside a target sphere. The light source 7 is fixed at the center of a sphere 8 formed from a transparent rigid material. Alternately, light sources may be attached to specific locations on the surface of solid spherical targets of the type described previously. Any convenient method such as use of set screws, threaded cable sleeves, or epoxy bonding may be used to anchor the cables into the spheres. A principal function of the spheres in the junction design is to facilitate the manufacture of highly accurate cable assemblies through the control of only one set of critical dimensions, the cable lengths between sphere surfaces.

Figure 4:
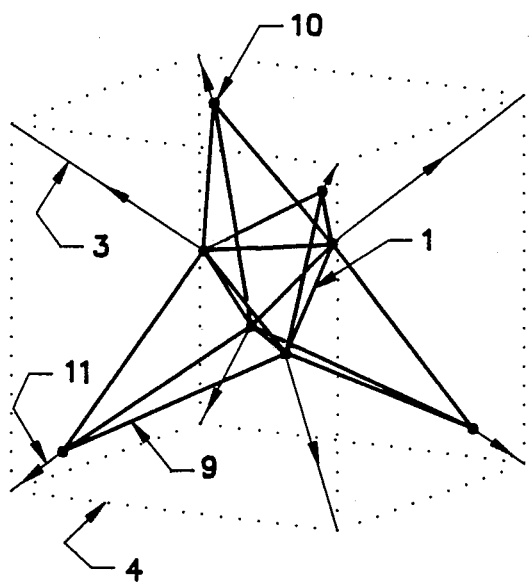
FIG. 4 is a perspective view of a five tetrahedron cable assembly also indicating the necessary tension directions.

Two tetrahedrons sharing a common base constitute an assembly at the next level of increasing complexity. Assemblies consisting of a central tetrahedron sharing faces with two and three other tetrahedrons are also possible, but result in asymmetrical configurations. The assembly consisting of a central tetrahedron whose faces form the bases of four other tetrahedrons is the one of principal interest. This construction results in an assembly with twelve triangular outer faces forming a dodecahedron. Referring to FIG. 4, the central tetrahedral cable assembly 1 tensioned by the elements 3 has attached to each face three additional cables 9. These cables meet in new junctions 10 to which are also attached tensioning members 11. The necessary tensions through 11 are directed along the diagonals extending between opposite coners of the cube 4 which schematically represents the support structure, and utilize the corners not used by the tensioning members 3 connecting to the central tetrahedron. By variation of lengths of the cables forming the central and peripheral tetrahedrons, the distribution of vertices and cables to which targets may be attached may be altered. A small central tetrahedron allows a larger concentration of targets at the center of the volume encompassed by the cable assembly, whereas if the central tetrahedron cable lengths are made equal to the square root of two times the peripheral cable lengths, the assembly assumes the shape of a cube with the cables of the central tetrahedron forming diagonals across each face of the cube. In the cubic configuration targets may be distributed in rectangular symmetry but they will all lie on the surface of the cube without the possibility of any occupying the central region. Thus the same basic device may be easily manufactured to provide differing distributions of target objects within the calibration volume; a very useful feature which enables the distribution to be optimized for particular applications.

The invention is described with reference to configurations possessing cubic symmetry, however, the implemetation is not restricted to assemblies with cubic symmetry. By use of varying cable lengths, target distributions within a rectangular volumes of any desired dimensions may be constructed. Indeed, the volumes are not restricted to being rectangular.

More complex configurations are possible but their number is limited by the requirement that the length of each cable not be dictated by the length of any other cable; a condition needed to ensure that all cables can be placed under controlled tensions by appropriate external forces applied only to the vertices. More complex shapes require tensioning in more complex directions.

Figure 5:
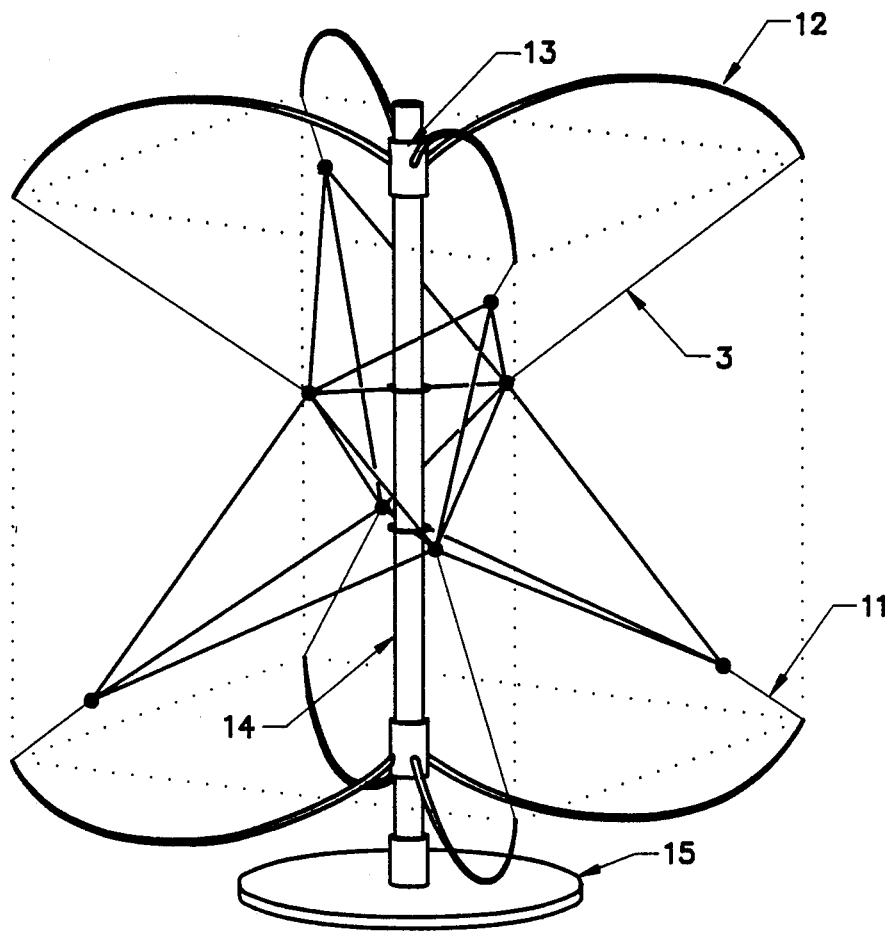
FIG. 5 is a perspective view of the tension providing support structure for the cable assembly illustrated in FIG. 4.

The support structure must provide suitable forces directed outwards in the directions of the long diagonals of a cube while minimizing resistance to motions of the cable junctions in directions perpendicular to the tension directions. This condition ensures that the cable tensions will be equal or symmetrical when the cable assembly reaches static equilibrium. FIG. 5 shows a suitable cable assembly support structure. Four arms 12 having flexible components are fixed radially to a collar 13 located at each end of a rigid column 14 in such a manner that when flexed to the appropriate degree they exert forces directed outwardly along the long diagonals of the cube 4. The tension members 3 and 11 attached to the cable assembly illustrated in FIG. 4 then attach to the ends of the flexible arms 12 to complete the basic device. A base 15 may be provided to allow the device to be free-standing. If the arms 12 in FIG. 5 are not flexible, then the tension members 3 and 11 must be elastic.

A number of mechanisms may be implemented to allow the arms to be folded to lie along side the central column. The detail of one such suitable mechanism is shown in FIG. 6. It includes a fixed collar 16 and a sliding collar 17 which travels over the central column 14 to spread the arms 18 through the linkages 19, 20, and 21. A spring loaded button 22 prevents the collar from sliding down under the tensions created by the deflection of the arms 18.

The described support structure has advantages over other possible structures, e.g. a cubic frame, in that; each arm provides a force which is largely independent of the other arms, motion of the cable junctions is unrestricted in the planes perpendicular to the tension directions, and the whole device may be quickly folded without any disassembly for storage and transportation.

The method for accomodating the central column so as to avoid interference with the central tetrahedron is detailed in FIG. 7. Rigid annuli 23 having holes large enough to freely accomodate the central column 14 are incorporated in the top and bottom cables of the central tetrahedron 1. The annuli are maintained in the horizontal plane by interconnecting them with the four cables 24 attached at the tetrahedron cable connection sites and at locations offset 90 degrees from these sites. The interconnecting cables are slightly slack so as to exert the minimum of forces on the tetrahedron cables but yet maintain the annuli in approximate horizontal planes and prevent them from contacting the central column.

FIG. 8 presents a deployed cable assembly in the form of a cube. In this implementation the central tetrahedron 1 forms diagonals across each face of the cube and the peripheral tetrahedrons 9 form its edges. The cable assembly previously illustrated in FIG. 5 may be tensioned by the application of equal forces to the long tensioning members 3 and the short tensioning members 11. For the cube, however, the forces applied by the tensioning members 3 attaching to the central tetrahedron must be greater than those applied to the vertices of the peripheral tetrahedrons through the tensioning members 11. The central tetrahedron must form a sufficiently stable base to allow the cables forming the peripheral tetrahdrons to be tensioned.

What is claimed is:

1. An apparatus for supporting a plurality of targets in precise relative spatial relationship comprising the combination of a plurality of substantially inextensible, flexible tension members of predetermined lengths interconnected at a plurality of vertices to form at least one tetrahedron;

means connected to said vertices for concurrently placing all said tension members under tension and for supporting said at least one tetrahedron; and a plurality of targets attached at selected ones of said vertices.

2. An apparatus according to claim 1 wherein said means connected to said vertices includes a substantially rigid column;

means for holding said column in a vertical position;

first and second groups of radially extending elastic support members at vertically spaced locations on said column; and means for connecting each of said support members to one of said vertices, said first and second groups being separated by a sufficient distance to place said elastic support members under stress and thereby exert tensile forces on said vertices and said tension members.

3. An apparatus according to claim 2 wherein each of said tension members is a cable.

4. An apparatus according to claim 3 which includes eighteen lengths of cable connected to form a dodecahedron including a central tetrahdron and four surrounding tetrahedrons, each of said surrounding tetrahedrons sharing a base with a different face of said central tetrahedron.

5. An apparatus according to claim 4 wherein each of said targets comprises a sphere enclosing a vertex of said dodecahedron.

6. An apparatus according to claim 5 wherein each said sphere encloses an active light source.

7. An apparatus according to claim 2 which includes eighteen tension members connected to form a dodecahedron including a central tetrahedron and four surrounding tetrahedrons, each of said surrounding tetrahedrons sharing a base with a different face of said central tetrahedron.

8. An apparatus according to claim 2 wherein each of said first and second groups of support members includes a collar surrounding said column;

a plurality of substantially rigid brackets supported on said collar and extending radially away from said column; and a stiff, flexible and elastic shaft attached to the distal end of each said bracket;

and wherein each of said means for connecting each of said support members to one of said vertices comprises a length of cable connected between the distal end of each said shaft and one of said vertices.

9. An apparatus according to claim 8 and including means for fixing positions for said collars along said columns.

10. An apparatus according to claim 9 wherein each of said support members includes a second collar; and a plurality of links pivotally connected at one end to said second collar and at the other end to one of said brackets, each of said brackets being pivotally attached to the first said collar, said collars being slidable relative to each other to allow said brackets, links and shaft to lie along said column for storage or transportation.

11. An apparatus according to claim 2 wherein said support members are foldable along said column.

* * * * *